Nov. 23, 1926.

R. BEAM

SHOCK ABSORBER

Filed August 6, 1923

1,607,809

INVENTOR
Robert Beam
BY
Adam E. Fisher
ATTORNEY

Patented Nov. 23, 1926.

1,607,809

UNITED STATES PATENT OFFICE.

ROBERT BEAM, OF WOODRIVER, ILLINOIS.

SHOCK ABSORBER.

Application filed August 6, 1923. Serial No. 655,942.

This invention is in the way of a shock absorber for automobiles, and is especially designed for use upon cars having springs arranged above and in alignment with the vehicle axles. The object of the invention is to provide a relatively simple, efficient and practical device of the kind.

Figure 1:
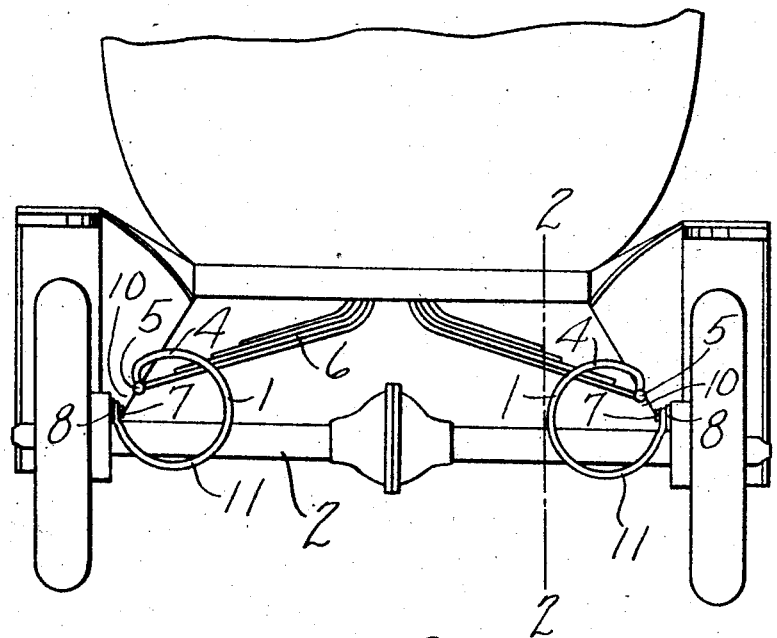
Figure 1 is a rear elevation of a car equipped with this improvement.
Figure 2:
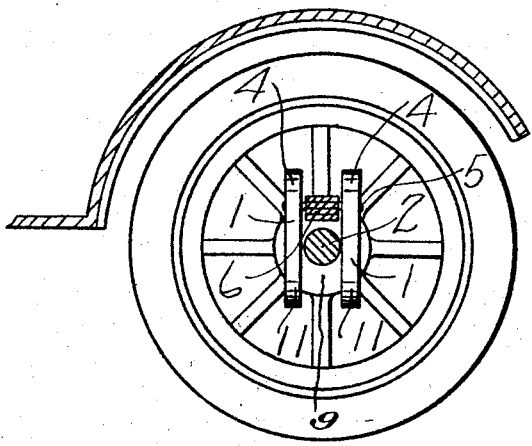
Figure 2 is a sectional view, taken on the line 2—2 in Figure 1.

The invention consists of a strong split spring ring 1 at each end of the rear axle 2. The upwardly disposed ends 4 of the rings are drawn inwardly and pivotally attached at 5 to the ends of the rear spring 6, while the other ends 11 are inclined outwardly and attached at 7 to the spring hanger 8 on the flange of the rear axle casing 9. The rings are disposed with their planes approximately vertical and parallel with the axle 2, and with the partings 10 located approximately one-third of the distance down the sides of the rings, measuring from the tops thereof as same are mounted in place.

In use and operation the points of attachment 5 and 7 play past one another and enable the spring rings readily to absorb all shocks, as well as the rebounds.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with a vehicle including an axle provided with flanges, said vehicles having springs arranged above and in alignment with an axle thereof, a shock absorbing device for connecting the outer end of each spring to the running gear, comprising pairs of split compression rings disposed vertically and parallel to the axle, one pair of split rings being arranged at the outer end of each spring and having portions extending above the springs and below the axle, the upper portion of each ring being directed from below the axle upwardly above the respective spring with its extremity directed downwardly in substantially a vertical plane and pivotally connected directly to the end of the respective spring at the other end, portion of the respective ring extending from below the axle upwardly and outwardly to a plane outside of the vertical plane of the outer end of the respective spring and secured above the axle to the respective flange, whereby upon compression the ends of the respective rings are forced inwardly across each other.

2. In combination with a vehicle including an axle provided with end flanges, said vehicles having springs arranged above and in alignment with an axle thereof, a shock absorbing device connecting the outer end of each spring to the running gear and including split compression rings, the upper portion of each ring being directed from below the axle upwardly above the respective spring with its extremity directed downwardly and pivotally connected directly to the end of the respective spring and the other end portion of such ring extending from below the axle upwardly and outwardly and secured above the axle to the respective flange, whereby upon compression the ends of the rings are forced inwardly across each other thereby effecting a coiling action on the rings under the influence of compression.

ROBERT BEAM.